UNITED STATES PATENT OFFICE.

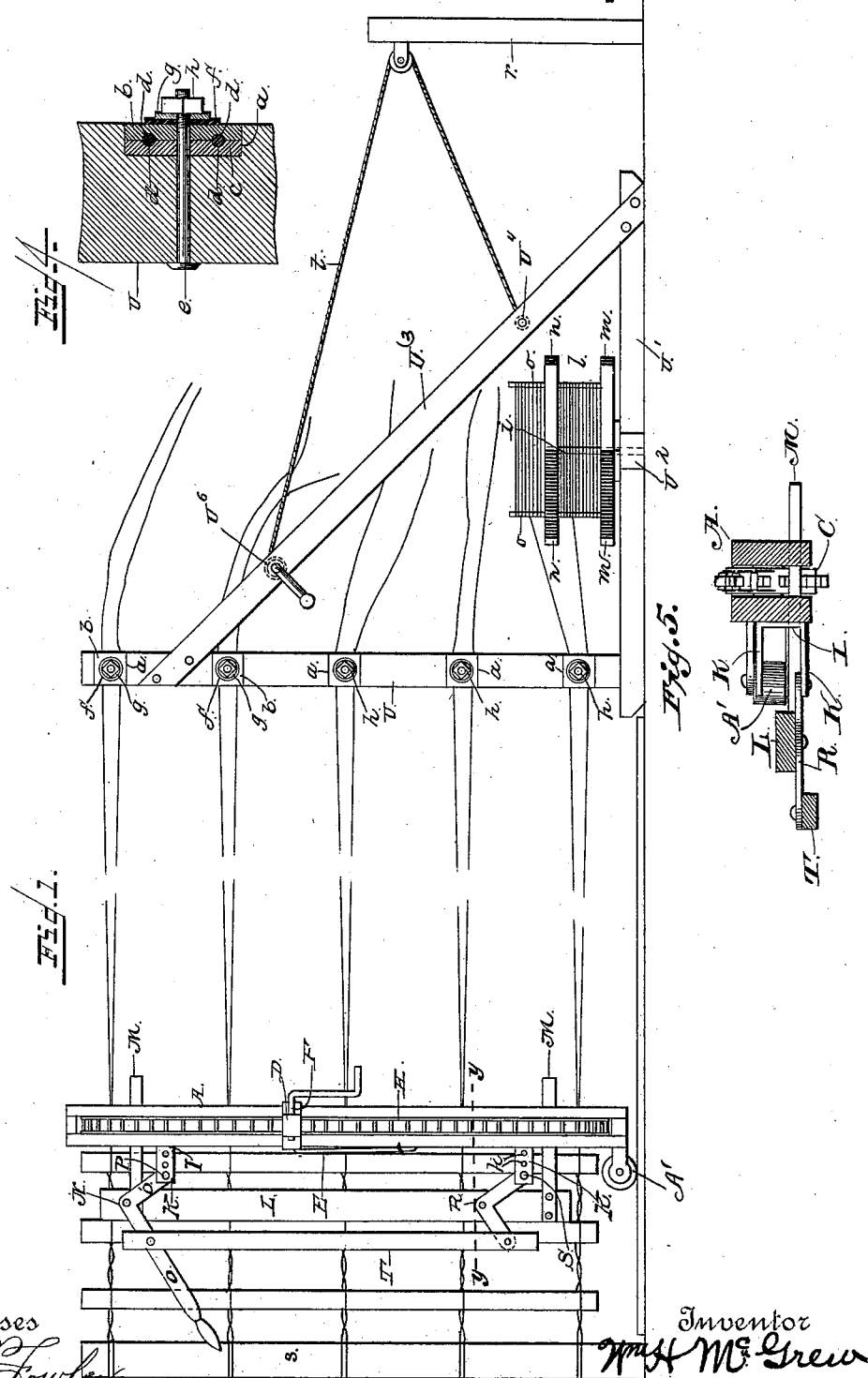

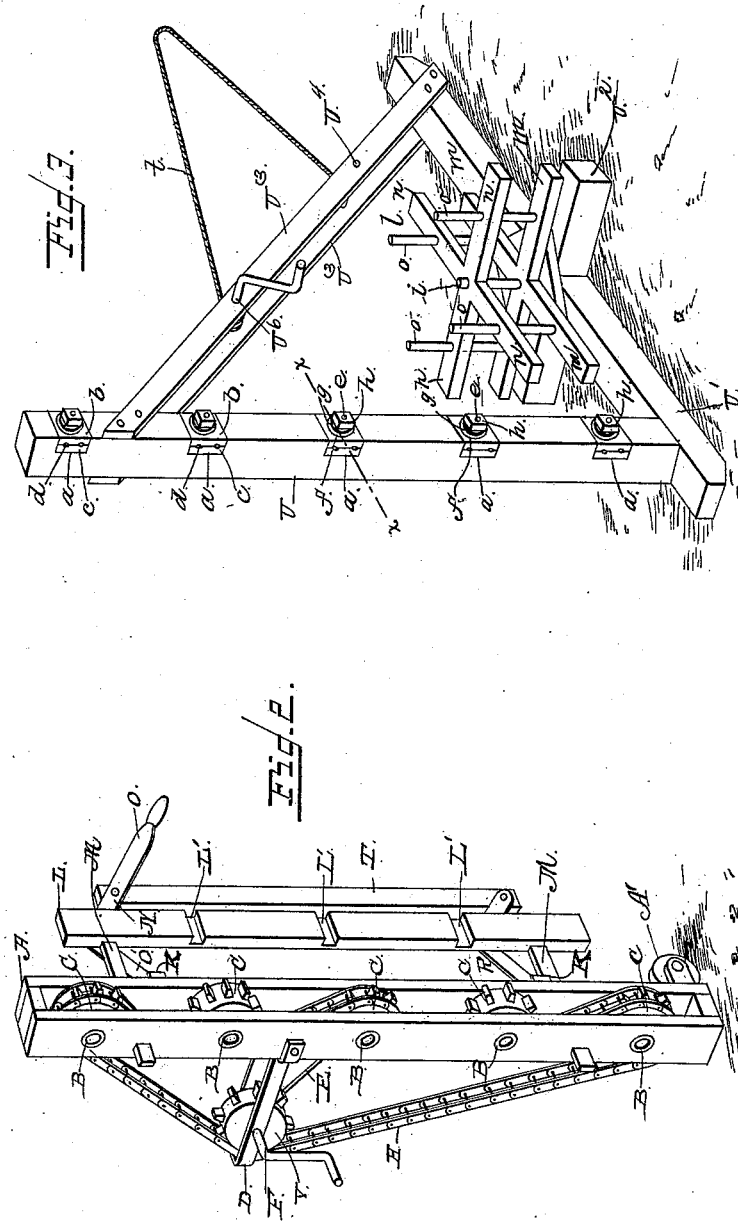

WILLIAM H. McGREW, OF PERU, INDIANA, ASSIGNOR OF ONE-HALF TO JOHN MYERS, OF SAME PLACE.

MACHINE FOR MAKING FENCES.

SPECIFICATION forming part of Letters Patent No. 361,308, dated April 19, 1887.

Application filed October 13, 1886. Serial No. 216,155. (No model.)

*To all whom it may concern:*

Be it known that I, WILLIAM H. McGREW, a citizen of the United States, residing at Peru, in the county of Miami and State of Indiana, have invented a new and useful Improvement in Machines for Making Fences, of which the following is a specification.

My invention relates to an improvement in machines for making fences; and it consists in the peculiar construction and combination of devices, that will be more fully set forth hereinafter, and particularly pointed out in the claims.

In the drawings, Figure 1 is an elevation of a machine embodying my improvements and of a fence in course of erection, the presser-bar of the machine being shown bearing against the front or right edge of the second picket. Fig. 2 is a detail perspective view of the devices for twisting wires around the pickets. Fig. 3 is a similar view of the tension devices. Fig. 4 is a transverse vertical sectional view of one of the tension devices, taken on the line $x\ x$ of Fig. 3. Fig. 5 is a horizontal transverse sectional view taken on the line $y\ y$ of Fig. 1.

A represents the box or frame, in which is journaled a series of rotating spindles or twisters, through which the wires are passed. Each of the said twisters B is provided with a sprocket-wheel, C, arranged between the sides of the box or frame. Near the upper end of the box or case and from one side thereof projects a horizontal arm, D, which is braced in position by a hook-rod, E. In the outer end of the arm D is journaled a crank-shaft F, which is provided with a sprocket-wheel, V. The said sprocket-wheel is connected to the sprocket-wheels C by means of an endless sprocket-chain, H, the said chain passing on opposite sides, alternately, of the sprocket-wheels C, so that the alternate twisters will be rotated in opposite directions when the crank is turned. From one side of the box or frame project keepers I, provided with parallel arms K, in which are made a series of openings, $k$.

L represents a presser-bar, which is provided at its upper and lower ends with horizontal arms M. The said arms extend through aligned openings which are made in the box or frame A, and thereby the presser-bar is adapted to be moved laterally toward or from that side of the box or case which is provided with the keepers I. To the upper end of the presser-bar L is fulcrumed a bell-crank lever, N, having an outwardly-extending arm, O, that forms a handle-lever. The lower arm, O', of the said bell-crank lever is connected by means of a pin, P, to the keeper at the upper end of the box or case, the said pin entering one of the openings $k$. To the lower end of the presser-bar is fulcrumed a bell-crank lever, R. One arm of the same is connected to the keeper at the lower end of the box or case by a pin, S, which engages one of the openings in the said keeper. The other arm of the lever R is connected to the handle-lever by means of a rod or link, T. The presser-bar L is provided on one side with a series of transverse open grooves, L', which align with the rotary twisters.

U represents the tension-bar, which is provided at its lower end with a base beam or bar, U', that is adapted to rest upon the ground, and is provided with a transverse arm, U², at its center. The outer end of the bar U' is connected to the upper end of the bar U by means of brace-bars U³. A bolt, U⁴, connects the said brace-bars near their lower ends, and in the said brace-bars, near their upper ends, is journaled a winch, U⁶.

The tension-bar U is provided on one side with a series of transverse recesses, $a$, which are arranged on the same horizontal planes with the rotary twisters in the box or case A. In the said recesses $a$ are located clamping-plates $b$ and $c$, which bear against each other, and are provided on their opposing sides with grooves $d$, to receive the wires of the fence. Clamping-bolts $e$ extend through the bar U and through openings which are made in the centers of the plates $b$ and $c$, and on the outer ends of the said clamping-bolts are placed elastic washers $f$. Metallic washers $g$ bear against the elastic washers, and on the extreme outer ends of the clamping-bolts are screwed nuts $h$, which bear against the metallic washers, and the function of which is to regulate the pressure or force with which the tension-plates bear against each other.

From the bar U', at the point where it is intercepted by the arm U², projects a vertical shaft or pin, $i$.

$l$ represents a reel, comprising the cross-arms $m$ and pins $o$, which project upwardly from near the ends of the said cross-arms. The said reel is pivoted upon the pin $i$, and is free to rotate thereon.

$n$ represents a pair of cross-arms, which are also pivoted upon the pin $i$, and are provided near their outer ends with vertical openings to receive the pins $o$. By this means it will be readily seen that the crossed arms $n$ may be detached from the reel $l$. When the crossed arms $n$ are attached to the reel, the latter forms a double reel, as will be very readily seen.

The operation of my invention is as follows: A post, $r$, is erected at one end of the proposed line of fence, and the posts $s$ are arranged at suitable distances apart along the fence-line. A rope, $t$, is passed through a pulley attached to the post $r$, and one end thereof is connected to the bolt or pin U⁴ of the tension device, the upper end of the rope being attached to the winch U⁶. By this construction it will be seen that the tension device is anchored at one end of the proposed line of fence. The cross-arms $n$ are removed from the pins $o$, and the ball or coil of wire is placed on the said pins. The crossed arms are then replaced on the pins over the ball or coil of wire, and the second coil or ball is then placed around the upper ends of the pins $o$, and bears upon the upper side of the crossed arms $n$. The reel is then journaled on the pin $i$, and the ends of the wires are passed through the grooves in the upper series of tension-plates on the bar U, and are drawn through the same and stretched across the proposed line of fence until the ends of the wires reach the end thereof, where they are secured to a post. A sufficient length of the wires is left beyond the tension-plates, and they are severed after being stretched from the balls or coils, and this operation is repeated until all of the tension-plates have been threaded. The last two wires which pass between the tension-plates at the bottom of the bar U are not severed from the balls. The winch U⁶ is then turned sufficiently to obtain the requisite tension on the wires, which are swung along the proposed line of fence, the said wires being previously passed through the rotary sleeves or twisters of the case or box A. The latter is provided at its lower end with a supporting-roller, A', and is moved along the wires to within a suitable distance of the post forming the starting-point of the proposed line of fence, and the wires are twisted by turning the crank, as will be readily understood. The operator then grasps the box or case and moves the same along the wires toward the right a slight distance, and he then inserts a picket between the wires and twists the same against the right edge of the picket by turning the crank as before, but in the contrary direction. The hand-lever O is then raised, which moves the presser-bar to the right toward and near to the box or case, and the operator moves the box or case toward the right, as before, a sufficient distance to leave a space between it and the picket to admit the presser-bar. The latter is then moved laterally toward the wires until the wires enter the transverse grooves L' thereof, and the presser-bar bears against the right or front edge of the picket, which is already secured between the wires. The operator then bears downward on the lever O, and thereby moves the machine to the right on the wires from the picket, thereby leaving room between the presser-bar and the machine or case for the insertion of a second picket between the wires. When the said second picket is inserted, the operator moves upward the free end of the lever O, which causes the machine or case to move to the left, and thereby force the second picket into the bights of the wires. The twisters are then rotated by turning the crank, thus securing the second picket. The operator then draws the lever O toward him, which moves the presser-bar out laterally from engagement with the wires, and he then raises the lever O, thereby moving the presser-bar toward the machine or case, the latter remaining still until the presser-bar passes the second picket, when it is forced laterally toward the wires and in front of the second picket, and the operation before described is repeated to secure a third picket to the wires, and so on.

As each picket is inserted the wires are drawn tighter and tighter, and the tension of the plates $b$ and $c$ on the wires must be so regulated as to allow the wires to slip between the said tension-plates, to prevent the wires from being stretched to too great an extent and broken. When each of the fence-posts is reached during the construction of the fence, the wires are secured thereto by means of staples.

In order to facilitate the movement of the twisting device along the line of fence, while the pickets are being secured between the wires, I propose to lay a board on the ground in a line under the wires, to form a track for the supporting-roller of the twisting device to roll upon.

Having thus described my invention, I claim—

1. The stretching device for fence-machines, having the base U', the vertical bar U, carrying the tension devices, the inclined brace-bars U³, connecting the base and bar U, and the winch journaled to the said brace-bars, for the purpose set forth, substantially as described.

2. The combination, in a fence-machine, of the movable box or case having the twisting devices for the wires, the parallel arms K, projecting from the rear side of the box or case, to receive a picket, the presser-bar, and the levers connecting the latter to the parallel arms, substantially as described.

3. The combination of the box or case A, having the rotary twisters and the parallel arms K, the presser-bar having the arms M, adapted to slide back and forth in the box or case A, the bell-crank levers connecting the presser-bar with the parallel arms, and the rod or link connecting the said bell-crank levers, for the purpose set forth, substantially as described.

4. The combination, with the tension-bar U, the tension device comprising the plates $b$ $c$, bearing against each other and having on their opposing faces the grooves for the wires, said plates being fitted in recesses of the bar U, so as to come flush with the outer side of the bar, the single through-bolt $e'$, passing through the bar, the elastic washer $f$, the plain washer $g$, and the nut $b$, as set forth.

5. The reel comprising the lower section, having the pins $o$, and the upper section having the openings to receive the said pins and connect the sections together, the said upper and lower sections having the same axis, substantially as described.

In testimony that I claim the foregoing as my own I have hereto affixed my signature in presence of two witnesses.

WILLIAM H. McGREW.

Witnesses:
R. P. EFFINGER,
ROBT. J. LOVELAND.